Dec. 31, 1940.  P. R. FINCH ET AL  2,227,181

PARKING METER

Filed Feb. 10, 1938  5 Sheets-Sheet 2

Inventors:
Percy R Finch and
Jay Mansfield Johnson,
By Banning & Banning
Attorneys.

Dec. 31, 1940.  P. R. FINCH ET AL  2,227,181
PARKING METER
Filed Feb. 10, 1938  5 Sheets-Sheet 3

Dec. 31, 1940.   P. R. FINCH ET AL   2,227,181
PARKING METER
Filed Feb. 10, 1938   5 Sheets-Sheet 5

Inventors:
Percy R. Finch and
Jay Mansfield Johnson,
By Banning Banning
Attorneys.

Patented Dec. 31, 1940

2,227,181

UNITED STATES PATENT OFFICE 2,227,181

PARKING METER

Percy R. Finch and Jay Mansfield Johnson, Chicago, Ill.; assignors, by mesne assignments, to Beacon Meters, Inc., Chicago, Ill., a corporation of Illinois Application February 10, 1938, Serial No. 189,724

20 Claims. (Cl. 161—15)

The parking meter of the present invention is designed with a view of affording adequate means whereby a large group of individual parking devices can be readily supervised by the traffic authorities and with a minimum of effort, so that overstaying the legal parking time may be readily detected, while at the same time making adequate provision for a continuing indication of the period of time which has elapsed since the actuation of the meter by an incoming motorist, so that at all times the parties interested will be properly informed with reference to the time remaining until the termination of the parking period.

The invention is one which is so devised as to display a preliminary or warning signal at a predetermined time in advance of the expiration of the parking period, so that both the motorist and the traffic authorities will be duly informed respecting the matter in question.

Provision is also made for controlling the operation of a large number of meters as a group from a convenient point of control, and for simultaneously disabling or decommissioning some or all of the meters in cases where parking rights are suspended for a time or where it is desired for other reasons to temporarily prevent the employment of the meters for parking purposes. Provision is also made for the automatic control of a heating device which will serve during cold weather to prevent the accumulation of frost or snow upon the meter, and to prevent the thickening or chilling of the oil, so that the meter will always remain in serviceable condition despite weather conditions.

The invention further relates to the means provided for coin-actuating the device and for the safe retention of the deposited coins and for the actuation of a counter to register the number of coins deposited.

The invention further relates to the means provided for coin-actuating the device in such a way as to restore the timing mechanism to the full parking period upon the insertion of a coin, so that the motorist will obtain the advantage of a full parking period prior to the display of the warning and terminal signals, which latter also informs the traffic authorities that the allotted period has expired and enables one or a very few policemen to supervise the operation of a large number of meters.

Further objects and details will appear from the description of the invention in conjunction with the accompanying drawings, wherein.

The operating parts of the meter are housed within a casing comprising a rectangular base section 25, a rectangular body section 26, and a transparent beacon 27 roofed over by a cap 28. The beacon is of reduced cross sectional dimensions as compared with the body and is connected therewith by a flaring collar 29 which is offset around its inner margin 30 to receive the lower edge of the glass beacon which rests upon a packing strip 31. The cap 28 is provided with a flanged rim 32 to which is secured an inwardly extending flange or ledge 33 which rests upon a backing strip 34 extending around the upper margin of the walls of the beacon 27.

The base portion of the casing is shouldered at a point 35 to receive the upper end of a supporting post 36 which is secured thereto by concealed screws 37. A circuit wire cable 38 passes upwardly through the post to a plug 39 for the purpose of supplying current for the operating parts presently to be described.

Within the lower part of the casing is located a motor 40 which is associated with a gear reduction train 41 which drives a vertically disposed feed shaft 42 having formed thereon screw threads 43. A carriage 44 rides upon the feed shaft, and when engaged with the screw threads thereof will be elevated thereby, but when disengaged will fall by gravity to the lowermost position permitted by an adjustable stop 45 which is carried by a guide rod 46 running parallel to the threaded feed shaft and in spaced relation thereto. When the stop 45 is adjusted to its lowermost position, the carriage will descend to a point representing the maximum period of parking time within the capacity of the meter, as for instance one hour, but if it is desired to reduce the parking period to fractions of an hour, the stop 45 can be adjusted to any one of the notches 47 which will reduce the parking period accordingly, the parking period in each case being that required for the screw feed to elevate the carriage from its lower or stopped position to the upper terminus of its travel.

Figures 5, 6, 7:
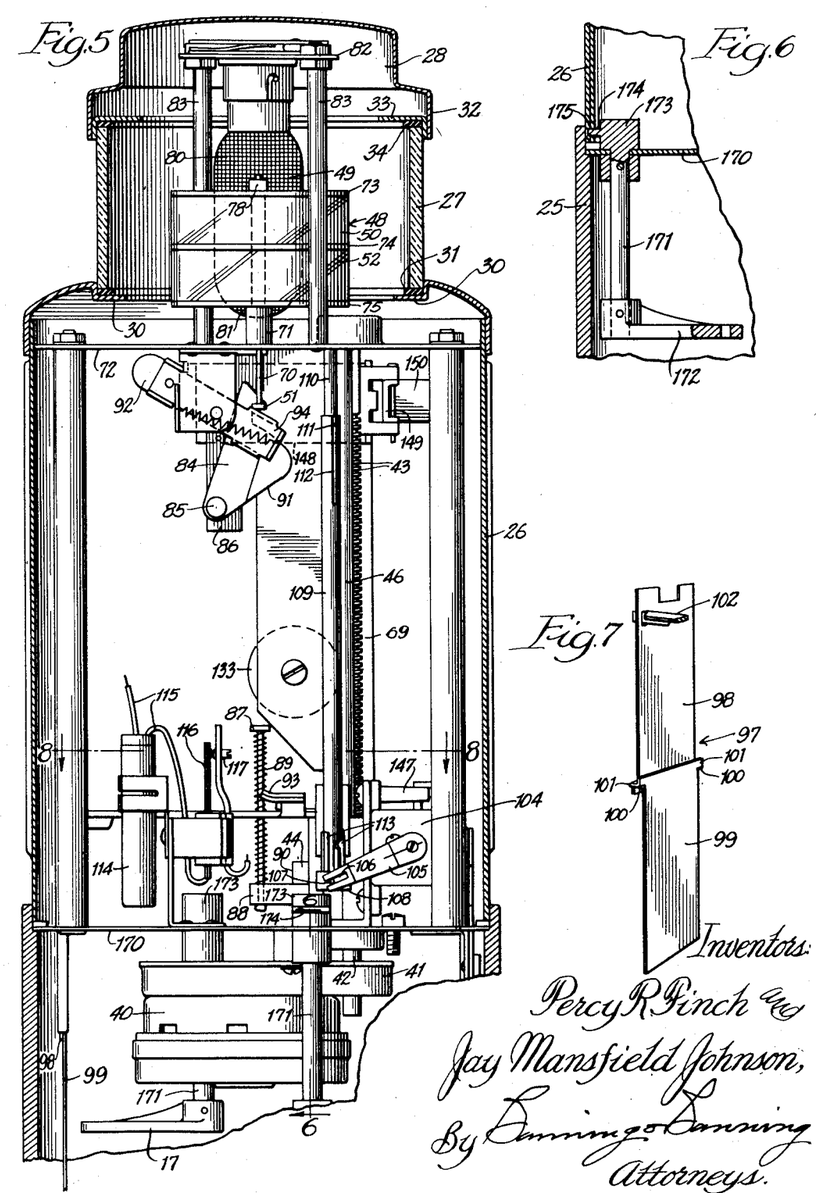
Fig. 5 is a view showing the working parts in elevation, with the casing sectioned on a plane at right angles to that of Fig. 3.
Fig. 6 is a detail of one of the latches for securing the upper portion of the casing to the base thereof.
Fig. 7 is a perspective view of the movable shield which indicates the lapse of time during the parking period.

The elevation of the carriage, as it approaches its upper terminus, serves to lift a transparent colored cylindrical screen 48 which surrounds a light bulb 49 located in the transparent beacon portion of the meter. The transparent screen consists of an upper section 50 of blue glass which, when the screen is lowered as in Fig. 5, will intercept the light rays and cause a blue light to shine through the walls of the beacon, thus indicating the fact that the meter is in operation in advance of the warning period, but, as the carriage approaches the limit of its upward travel, it will encounter a bridge bar 51 which supports the screen, and thereafter the continued movement of the carriage will effect the sudden elevation of the screen to the position indicated in Fig. 15, which brings an amber section 52 of the screen into register with the light filament, so that during a limited period of time at the terminus of the parking period an amber or warning light will be displayed, thus calling the attention of the motorist and of the traffic authorities to the fact that the parking period has almost expired.

Figure 9:
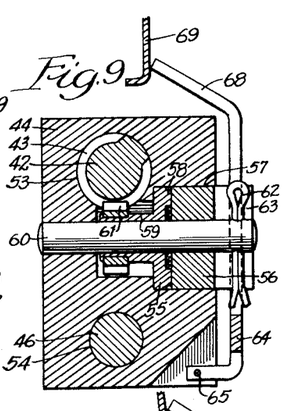
Figs. 9, 10 and 11 are details of the clutch and trip mechanism for engaging the vertically movable carriage with the screw feed.
Figure 10:
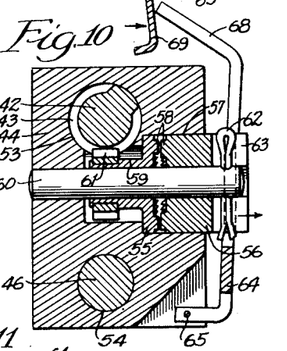
Figure 11:
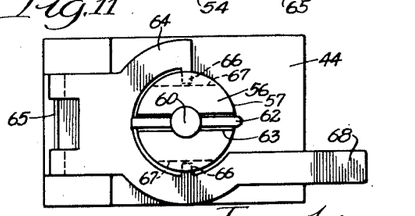

Referring to Figs. 9, 10 and 11, it will be seen that the carriage 44 is in the form of a generally rectangular block which is provided with two smooth vertical bores 53 and 54, the former of which has the threaded screw feed shaft 42 entered therethrough, and the latter of which has the smooth guide rod 46 entered therethrough. When the carriage is disengaged from the threaded feed shaft 42 it will ride freely upon the shaft and the rod, so that under these conditions it may drop by gravity to its lowermost position. In order to positively engage the carriage with the threaded shaft, coacting clutch members 55 and 56 are provided, both of which are housed within a socket recess 57 in the carriage. The coacting clutch members are provided with opposed teeth 58 so disposed that when the member 56 is thrust inwardly as in Fig. 9, the teeth will engage with one another, but when the member 56 is withdrawn as in Fig. 10, the teeth will be disengaged.

The clutch member 55 carries a hub 59 freely mounted upon a fixed stub shaft 60 socketed within the carriage block, and the hub 59 has fixedly mounted thereon a worm pinion 61 which meshes with the threads 43 on the feed shaft 42. The clutch member 55 is held against rotation by a cotter pin 62 entered through the end of the stub shaft 60 and lying within a slot 63 in the end of the clutch block 56. The clutch block has limited sliding movement on the fixed stub shaft 60 and may be unclutched by the action of a bifurcated trip yoke 64 which is hinged upon a pintle 65 (see Fig. 11) and is provided with inturned fingers 66 which engage within cross-cut slots 67 on opposite sides of the clutch block 56.

One of the arms of the trip yoke terminates in a finger 68 which is adapted to be engaged and tripped at any stage in its elevation by a vertically elongated trip bar 69 and shifted from the position shown in Fig. 9 to the position shown in Fig. 10, thereby retracting the clutch block 56 and disengaging the clutch teeth, which permits the carriage to descend by gravity with the entrained clutch member 55 and its pinion 61 rotating freely upon the threads of the feed shaft. Coin operated means are employed for actuating the elongated trip bar 69, and this will be described in detail hereafter.

Referring to Figs. 13, 14, 15 and 16, the bridge bar 51 which supports the light screen has upwardly springing therefrom a pair of vertical rods 70 each entered through a bushing 71 mounted upon a plate 72, which furnishes a platform for supporting the lamp bulb in a manner presently to be described.

The screen itself consists of three spaced rings 73, 74, 75, which in unison furnish a frame for the support of the transparent colored wall sections 50 and 51, each of which is of cylindrical formation. Each of the rods 70 extends upwardly through an inner fixed sleeve 76 having its lower end fixedly mounted within the associated bushing 71, and the fixed sleeve furnishes a mounting for an outer slidable sleeve 77 which is connected to a plug 78 into which the upper end of the rod 70 is threaded. The rods 70 in unison with the connecting bridge bar 51 thus furnish a support for suspending the movable screen and permitting it to be raised and lowered freely upon the inner fixed sleeves 76 without tilting or binding.

The lamp bulb consists of a transparent center section 79 and opaqued upper and lower sections 80 and 81, so that the only light transmitted will be that from the center of the bulb, which will thus be directed exclusively within the particular section of the screen which for the time being occupies a position in register with the center of the light bulb, so that, save for the instant of transmission of the screen to its upper position, there will be no commingling of the light colors. The bulb is suspended from a plate 82 which is supported by spaced posts or standards 83 springing upwardly from the plate 72.

In view of the fact that the carriage advances at a relatively slow rate of speed, and of the fact that it is necessary to effect a sudden shifting of the light screen at the proper instant, provision is made for a tensioning and sudden release of the bridge bar 51, which, when the carriage is in its lowered position, will be engaged by a latch finger 84 pivoted on a pintle 85 carried by a bracket 86.

The carriage is provided with a plunger rod 87 slidably mounted within an arm 88 and backed by a coil spring 89. As the carriage approaches its uppermost position, the plunger 87 will engage the bridge bar 81, and thereafter a continued elevation of the carriage will compress the spring as in Fig. 14, and this condition will continue until the latch 84 is drawn back, which suddenly releases the bridge bar and allows the spring to act to project the light screen upwardly into the position shown in Fig. 15, thereby effecting a sudden transition from the blue light to the amber light.

Figures 13, 14, 15, 16:
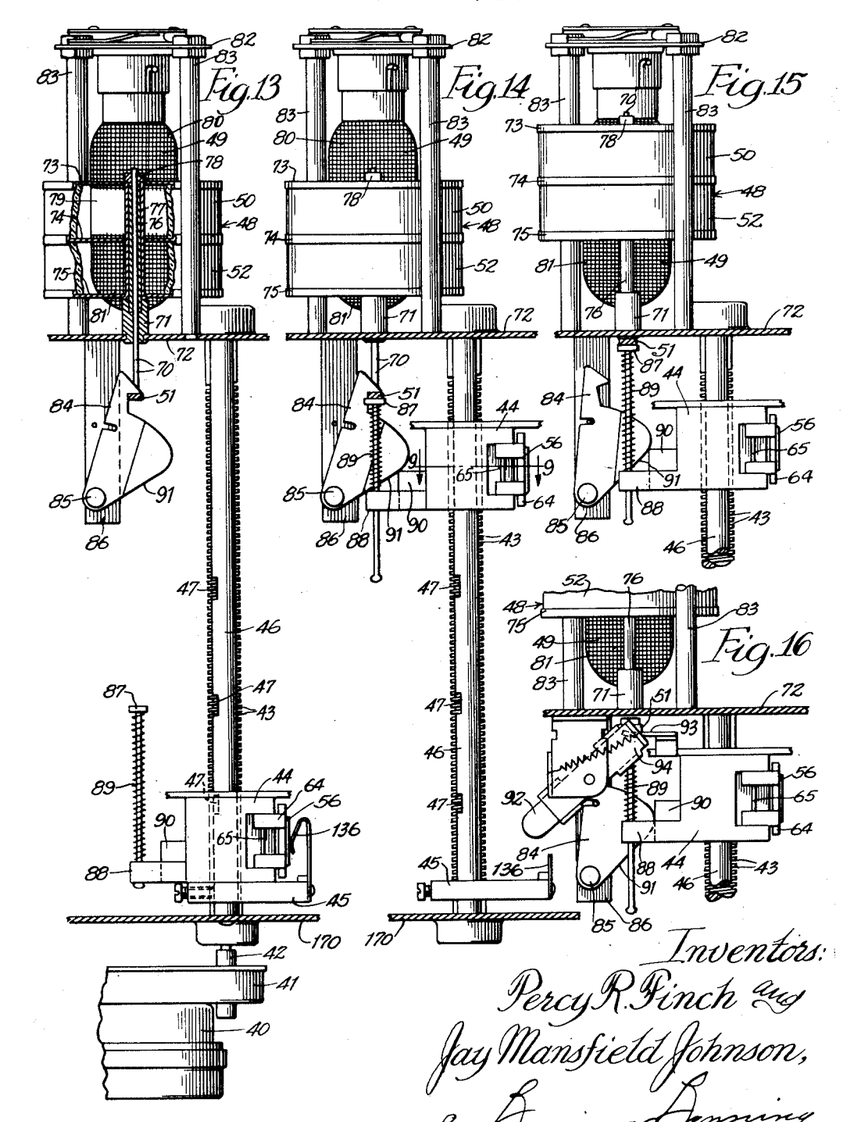
Figs. 13, 14 and 15 are elevations showing the screw feed shaft, the carriage, and the light screen in different positions of adjustment.
Fig. 16 is a view of the same parts with the inclusion of the mercury cut-off switch which controls the operation of the motor.

The latch 84 is actuated by the contact of a block or projection 90 on the carriage with the beveled lower edge 91 of the latch, which, as the carriage rises, throws back the latch into the releasing position indicated in Fig. 15. Thereafter, during a short interval (for instance five minutes), the carriage will continue to travel upwardly, and during this terminal interval will encounter a pivoted mercury switch 92, which controls the operation of the motor when the switch occupies its normal closed position indicated in Fig. 5. However, during the final upward movement of the carriage, the switch will be swung upwardly beyond the horizontal position by the engagement of a finger 93 on the carriage (Figs. 5 and 16) with the spring biased, pivoted cradle 94 which mounts the switch, so that at the proper instant the switch will be tilted reversely by the spring from the circuit closing position indicated in Fig. 5 to the circuit breaking position indicated in Fig. 16, which stops the motor and also extinguishes the light, thereby indicating the expiration of the allotted parking period after a short warning interval during which the amber light is displayed. The carriage, however, will remain at rest in the elevated position until the clutch 55—56 is released by the insertion of a coin in the manner to be presently described.

Figure 8:
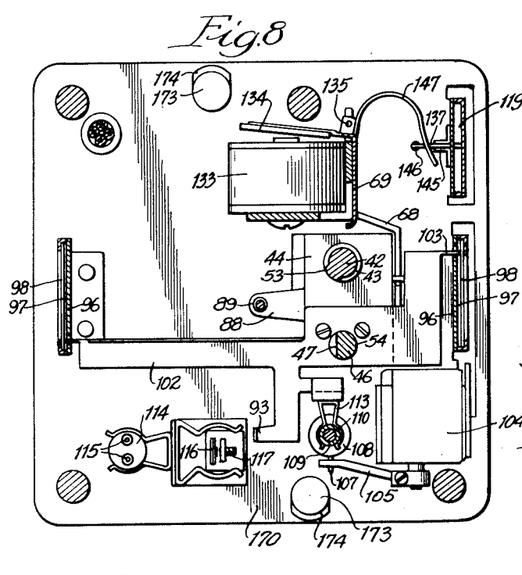
Fig. 8 is a sectional elevation taken on line 8—8 of Fig. 5.

In order to visibly indicate the passing of time during the parking interval, the casing on each side is provided with a vertically elongated window 95 behind which is located a gage plate 96 suitably divided and marked as shown to indicate five minute intervals of time during the sixty minute parking period. As the carriage rises, it will elevate each of a pair of shields 97, shown in perspective in Fig. 7, each of which shields consists of an upper section 98 and a lower section 99, which are fitted to telescope together for the conservation of space when the shield is lowered. To permit this telescoping operation, the upper shield is provided near its lower edge with a pair of tongues 100 which are struck forwardly and adapted to engage beneath shoulders 101 near the upper edge of the lower section, the arrangement being such that the upper section will be lifted independently from the lowered position in which the two sections overlap one another, until the tongues engage the shoulders, after which the two sections will be lifted in unison. As shown in Fig. 8, the upper shield sections on opposite sides of the meter are engaged by arms 102 and 103, respectively, extending oppositely from the carriage, and the elevation of the carriage will have the effect of progressively obscuring the time gage so that lapse of time will be continuously indicated.

It is desirable to provide a counter for registering the number of times the meter is actuated, and for this purpose a counter 104 (Figs. 5 and 8) is employed, which is provided with an operating arm 105 bifurcated at its outer end 106 to engage a pin 107 on a collar 108 located at the lower end of a tubular sleeve 109 slidably mounted upon a fixed rod 110 upon which it is fitted to have a limited vertical movement and held against rotation by a pin 111 which projects through a slot 112 on the sleeve. A portion of the carriage (Fig. 8) is provided with a spring clip 113 which frictionally engages the sleeve 109 and is adapted on the upward movement of the carriage to lift the sleeve throughout its limit of movement and thereafter to ride freely upon the sleeve during the remainder of the upward carriage movement. The descent of the carriage will reverse the movement of the sleeve and thus restore the counter arm to its lowermost position, thereby completing the counting operation.

Figure 12:
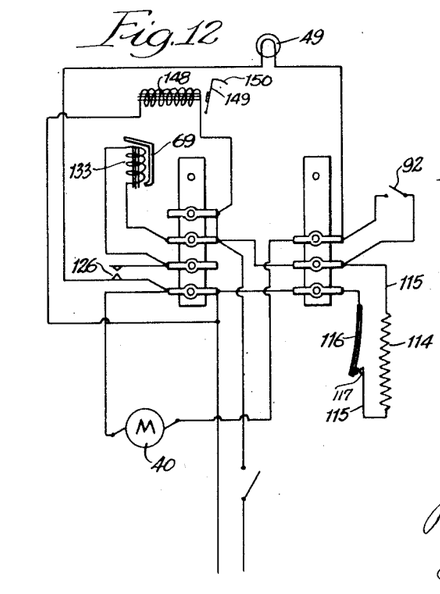
Fig. 12 is a wiring diagram showing the circuit connections for the various operating parts.

In order to prevent the accumulation of frost or snow upon the windows of the meter, a heater 114 (Fig. 5) is provided, which is supplied with electric current through wires 115 controlled by a thermostatic switch consisting of a bimetallic flexible arm 116 adapted when flexed to engage an adjustable contact 117 to close the heating circuit across the power line, as shown in the electric circuit diagram in Fig. 12. The thermostat which may also be of conventional character can be adjusted to establish contact when the temperature falls below freezing, or to any other desired temperature.

Coin actuated mechanism

Upon the deposit of a coin for the actuation of the meter, the carriage will first of all be restored to its lowermost position, so that the motorist will be insured of a full parking period. The coin is inserted into an opening 118 in the upper end of a coin chute 119, and the coin passage is of sufficient width to permit the free passage of a coin of the proper denomination (for instance a nickel), without, however, allowing any free movement from the intended line of travel. As the coin passes downwardly, it will encounter a contact plate 120 secured to a flange 121 formed on the edge of an arm 122 carried by a pivoted bar 123.

The contact plate normally extends across an open recess 124 formed in the inner edge of the coin chute 119 (Fig. 17) and so disposed as to partially block the free passage of the coin, so that the weight of the coin will swing the contact plate outwardly and with it the bar 123. The bar at its upper end carries a permanent magnet 125 (Figs. 21 and 22), which is located closely adjacent to a mercury switch comprising a bulb 126 wherein is located a drop of mercury 127 occupying a cup 128 at the lower end of the bulb. A circuit wire 129 is permanently in contact with the mercury drop and the circuit is closed by the swinging inwardly of a contact point 130 carried by a pole piece 131 of ferrous material suspended by a coil spring 132.

Figure 21:
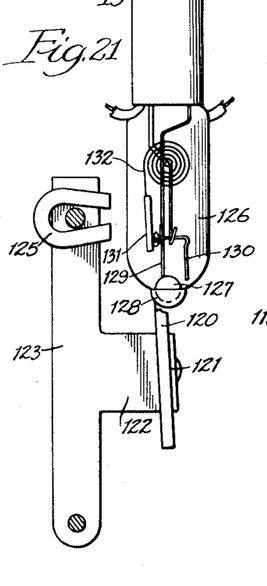
Figs. 21 and 22 are details of the coin actuated magnet and mercury switch actuated by the passage of a coin.
Figure 22:
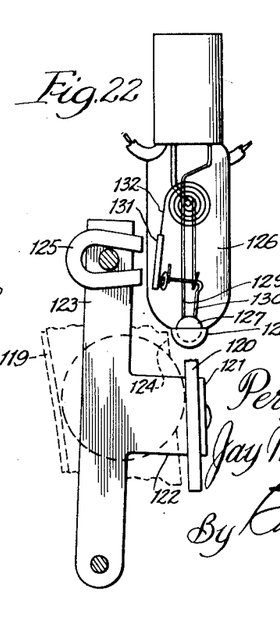

The spring normally holds the contact point 130 away from the mercury as in Fig. 21, but the passage of the coin causes the magnet to swing inwardly into close contact with the switch bulb 126, which draws the pole piece to the left as in Fig. 22, thereby effecting a contact through the mercury, which closes a circuit 126a leading to a solenoid coil 133 (Figs. 8 and 12), thus energizing the coil and drawing down its armature 134, which is pivoted on a pintle 135 and is rigidly connected with the vertically elongated trip bar 69 so that the two swing in unison. Thus the passage of a coin will momentarily energize the solenoid for a sufficient time to draw back the carriage clutch element 56 which releases the carriage from the feed screw and allows it to drop by gravity to the position indicated in Fig. 13. As soon as it has reached this position, however, the clutch element 56 is restored to clutching position by the action of a spring finger 136, so that the carriage will immediately begin its timed ascent to mark off the time intervals comprising the parking period.

The coin, after it has passed the switch operating plate 120, will be arrested by the lower finger 139 of an escapement bar 137, until the deposit of a succeeding coin. The escapement bar 137 (Figs. 19 and 20) is provided with an upper finger 138 as well as a lower finger 139, the upper finger working through a slot 140 in the side wall of the coin chute, while the lower finger operates through a slot 141. The coin while arrested is visible through a window 142 in the coin chute, which window registers with an outer window 143 in the meter casing, so that the motorist will note the arrival of his coin at the intended position.

Figures 17, 18, 19, 20:
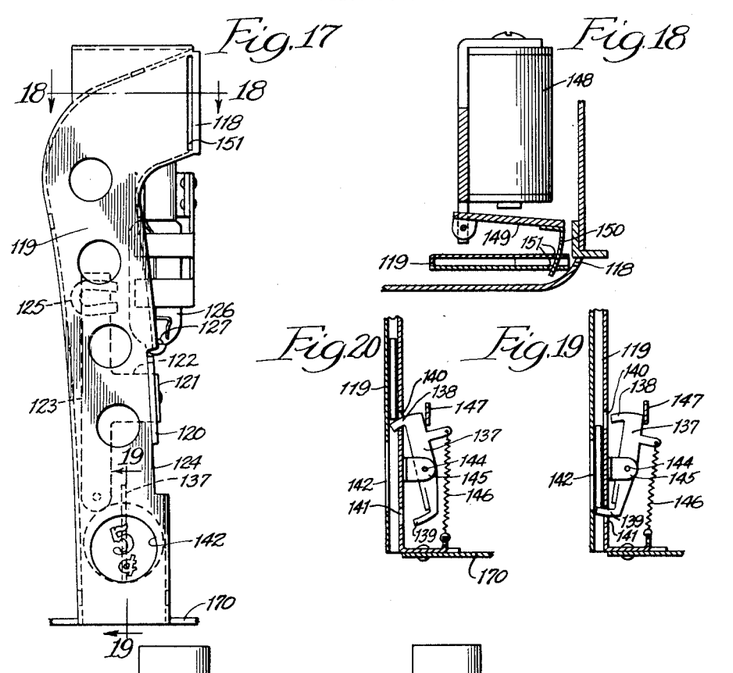
Fig. 17 is a side elevation of the coin chute and associated parts.
Fig. 18 is a view of the gate for blocking the admission of coins.
Figs. 19 and 20 are views showing the coin arresting mechanism in two positions of adjustment.

The escapement bar is pivoted on a pintle 144 carried by ears 145 secured to the wall of the coin chute, and is normally held in the position shown in Fig. 19 by the action of a spring 146 which projects the lower finger 139 through the lower opening 141 and simultaneously retracts the upper finger.

However, the subsequent energizing of the solenoid 133 by the passage of the next succeeding coin will reverse the position of the escapement bar, thus releasing the preceding coin. This is effected by the action of a tail piece 147 on the armature 134 which is shown in edgewise position in Fig. 8 and in section in Figs. 19 and 20. The tail piece normally occupies the retracted position shown in Fig. 19, but when the solenoid is energized it will be swung slightly to the right in Fig. 8 (left in Figs. 19 and 20), thereby swinging the escapement bar against the tension of the spring 146 to withdraw the finger 139 which releases the arrested coin. It will be seen therefore that when a coin is deposited to actuate the armature 134 of the solenoid 133 to effect release of the first coin, Fig. 19, the second coin will be held in the position of Fig. 20 during the time required for the tail piece 147 and other parts affected by the energizing of the solenoid 133 to be returned to their normal positions, Fig. 19, under the action of the spring 146. The second coin will then be arrested by the finger 139 as was the first coin so that all parts will again assume the positions shown in Fig. 19.

It is desirable to make provision for the disabling or decommissioning of one or more of the parking meters operable from a distant point, and for this purpose a solenoid coil 148 (Fig. 18) is employed, which is provided with a pivoted armature 149 carrying an arcuate gate 150, which when the armature is deenergized will project through companion slots 151 in the walls of the coin chute near the coin aperture 118. When the armature is energized, however, the gate will be retracted and the coin chute will be opened to receive coins. The gate is of a size to completely block the coin entrance, so that when closed, tampering through the coin slot will be prevented.

Figures 1, 2, 3, 4:
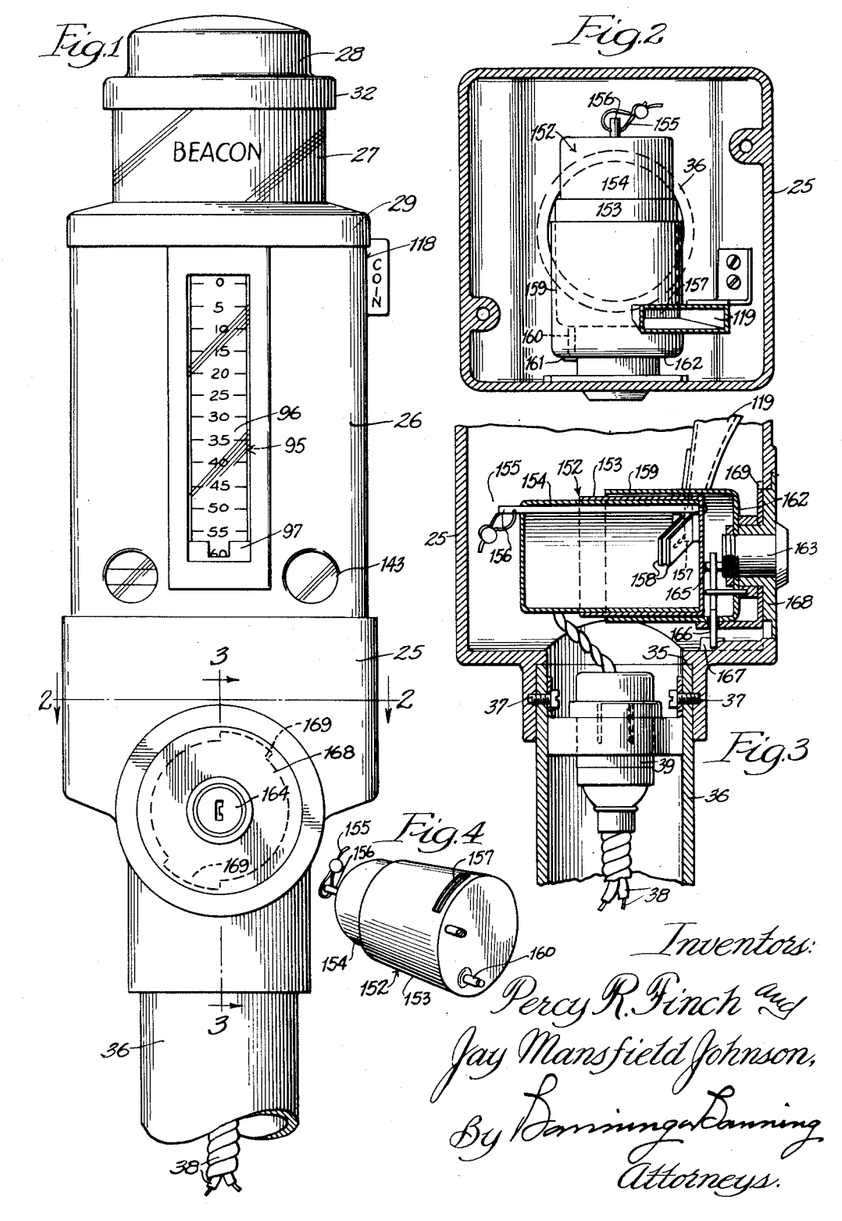
Figure 1 is a front elevation of the upper portion of the meter showing the supporting base or standard broken away.
Fig. 2 is a cross sectional elevation taken on line 2—2 of Fig. 1, looking in the direction of the arrow.
Fig. 3 is a sectional elevation taken on line 3—3 of Fig. 1, looking in the direction of the arrow.
Fig. 4 is a perspective view of the removable coin box for the reception of the coins.

The coin chute, at its lower end, discharges the coins into a cylindrical coin box 152 (Fig. 4), which consists of an outer cylindrical section 153 and a telescoping inner section 154, which when nested together as in Fig. 2 may be sealed by the insertion of a sealing wire 155 entered through a rod 156 secured to the forward end wall of the outer coin box section.

The coins enter the coin box through registering apertures 157 positioned at the lower terminus of the coin chute, and the coins are directed inwardly within the coin box between spaced guide plates 158 which prevent access to the interior of the box through the slot 157.

The coin box is held in position within a cup-shaped shell 159, by means of a snap fastener including a grooved stud 160 on the end wall of the outer coin box section 152, which stud engages with a companion female section 161 on the forward end wall 162 of the shell. The snap fastener is of the character commonly employed as a glove fastener and serves to hold the coin box in registering position within the shell, but at the same time permits easy removal of the coin box after the shell has been removed from the casing.

The end wall of the shell receives the inner end of a cylinder lock 163 provided with a rotatable barrel 164 of the usual construction, provided with tumblers of well known character, and when the associated key is inserted, the barrel may be rotated in the usual manner. The barrel at its inner end is provided with an eccentric pin 165 which engages the upper end of a lock bolt 166, which when thrown engages a recess 167 in the base section of the casing.

The cylinder lock is mounted within a face plate 168 which is fitted into an aperture in the front wall of the casing, which aperture is of a size to permit removal of the entire assembly including the shell 159 and the coin box associated therewith. When the barrel of the lock is turned to lift the bolt 166 from the recess 167, it will thereafter be possible to rotate the face plate itself sufficiently to bring the end of the bolt into register with an arcuate recess 169 (Fig. 1), which permits the locking unit to be drawn forward and removed in its entirety from the casing, after which the coin box can be disengaged from the snap fastener and opened by breaking the seal. The removal of the coin box permits access to be obtained to the interior of the casing through the opening thus vacated by the coin box assembly, and from the access thus obtained it is possible to remove the body section of the casing by the means now to be described.

The floor plate 170 of the body section of the casing is provided with a plurality of depending rock shafts 171 (Fig. 6), each provided at its lower end with an arm 172. The upper end of each rock shaft terminates in a head 173 provided with a locking tongue 174 which engages a recess 175 in the wall of the casing. By turning the rock shaft the tongue will clear the recess 175, and when all of the locking members have been thus adjusted, the body section of the casing will be released from engagement with the base section and may be removed as a unit for repair or replacement of parts.

Operation

When it is desired to place one or more of a group of parking meters in commission, the solenoid 148 is energized, usually from a remote point of control, which retracts the coin gate 150 on each of the meters included within the group or series, thus permitting the coins to be deposited. When inserted, a coin will descend through the coin chute and first of all encounter the plate 120 carried by the swinging arm 123, which will thus swing under the impact of the coin and bring the magnet 125 into coacting relation with the mercury switch 126, thereby closing the circuit and energizing the solenoid 133. This results in a release of the clutch members which engage the carriage with the screw feed and permits the carriage to fall to its lowermost position.

If full time parking is permitted within the time capacity of the meter, the carriage will drop to its lowermost position, but if a reduced parking period is desired the fall of the carriage will be arrested at a higher elevation. With the descent of the carriage, the clutch elements will be again engaged and the carriage thrown into train with the rotating screw feed shaft, so that the carriage will begin to ascend at a timed rate of speed.

The upward movement of the carriage will be visibly indicated on each side of the meter by the tolling off of the marked spaces on the gauge plates, so that the lapse of time during the parking period will be continually indicated. As the carriage approaches its upper terminus, the spring-backed plunger rod 87 will encounter the bridge bar 51 which supports the light screen which during this interval will occupy its lowermost position for the display of the blue or violet light. The screen, however, will not be immediately elevated by the continuing rise of the carriage, being locked during this interval by the latch 84. This will store up tension in the spring surrounding the plunger bar until the instant when the latch is kicked back by the continued rising of the carriage, which suddenly releases the support for the light screen and allows the same to spring upwardly into its elevated position, thus bringing the amber glass of the screen into register with the light rays, which provides a warning signal indicating the short terminus of the parking period. When the carriage has reached the limit of its upward movement, the light will be extinguished, and the motor will cease to operate until a new cycle of operations is initiated by the insertion of another coin.

The insertion of the second coin will release the coin previously arrested by the escapement device, thereby allowing the first coin to pass on down into the coin box, where the coins will be accumulated until an attendant unlocks the mechanism and removes the coin box for the collection of the accumulated coins.

The mechanism is one which provides for the restoration of the carriage by the deposit of each new coin irrespective of the position occupied by the carriage at the instant when the coin is deposited. Each motorist, therefore, is assured of the full parking period, which would not be obtained unless the carriage were completely restored to its starting position.

The display of the amber light affords a warning for the motorist occupying the parking space and also a warning for the traffic authorities, who are thus enabled from a considerable distance to supervise the operation of a large number of meters and prevent occupancy of the parking space after the expiration of the period, thus preventing abuse of the parking privilege.

The use of parking meters enables an accurate supervision of the parking area to be maintained, and expedites the movement of traffic by preventing abuses of the parking privileges, so that it is possible to provide for the parking of a greatly increased number of cars than would be possible in cases where no provision is made for the accurate timing of the parking period or warning when the period has expired.

The present invention is designed to provide for all contingencies which may arise and to afford a convenient and effective means for regulating the parking rights throughout an extended area with a minimum of supervision.

Although the invention has been described with particularity as to detail, it will be understood that numerous changes in the structure of the device may be made without departing from the principle of the present invention.

We claim:

1. In a parking meter including a casing and a movably mounted indicator visible through a wall of said casing, a source of illumination within the casing, a movable light screen coacting therewith and having different sections thereof constructed to display differing light signals through said casing wall, and coin controlled mechanism for operating said indicator through a range of movement commensurate with a predetermined parking period, said mechanism coacting with said light screen only after the lapse of a portion of the parking period to move the light screen to effect a visible change in the light signal before said indicator completes said range of movement.

2. In a parking meter, the combination of a source of illumination, a movable light screen coacting therewith and having different sections thereof constructed to display differing light signals, and coin controlled time measuring mechanism having a range of movement commensurate with a predetermined parking period, said mechanism coacting with said light screen only after the lapse of a portion of the parking period to move the light screen to effect a visible change in the light signal before said mechanism completes said range of movement, and visible gauge devices associated with said mechanism and light screen and having the lapse of time during the parking period visibly indicated thereon.

3. In a parking meter, the combination of a source of illumination, a movable light screen coacting therewith and having different sections thereof constructed to display differing light signals, and coin controlled time measuring mechanism having a range of movement commensurate with a predetermined parking period, said mechanism coacting with said light screen only after the lapse of a portion of the parking period to move the light screen to effect a visible change in the light signal before completion of said range of movement, visible gauge devices associated with said mechanism and including a plate having inscribed thereon indicia representing the entire parking period and range of movement of said mechanism, and means progressively obscuring portions of the gauge plate and indicia during operation of said mechanism, said obscured portions representing the expired part of the parking period.

4. In a parking meter, the combination of a casing provided with a light transmitting window and a source of illumination within the casing adjacent said window, a screen mounted within said casing for movement relative to the source of illumination and window provided with portions cooperating with the source of illumination to display varying signals, coin controlled time measuring mechanism adapted to move through a predetermined range during a predetermined period of time constituting the parking period, and means actuated by the movement of said mechanism for effecting a relative change of movement between the source of illumination and the light screen after a predetermined interval preceding the termination of the parking period.

5. In a parking meter, the combination of a casing provided with a light transmitting beacon having a source of illumination within the beacon, a screen adapted to be moved relative to the source of illumination and provided with portions adapted in conjunction with the source of illumination to display varying signals, an indicator, coin controlled time measuring mechanism adapted to move said indicator from an initial position through a predetermined range during a predetermined period of time constituting the parking period, and means actuated by the movement of the time measuring mechanism for effecting a relative change of movement between the source of illumination and the light screen after a predetermined interval preceding the termination of the parking period, and means actuated by a second coin for effecting restoration of the time measuring mechanism to its initial position at any instant during its period of movement to permit the initiation of a new cycle of operations without actuating said light screen.

6. In a parking meter, the combination of a source of illumination, a movable light screen coacting therewith and having different colored sections thereof constructed to display differing light signals, coin controlled time measuring mechanism including a parking period indicator, said indicator being mounted for movement independently of said mechanism and having a normal range of movement with said mechanism commensurate with a predetermined parking period, and said mechanism operating after the lapse of a predetermined portion of said parking period to move said light screen relative to the source of illumination to effect a visible change in the light signal, and means for effecting restoration of said indicator to its initial position at any instant during its range of movement to permit the initiation of a new cycle of operations without interrupting the operation of said mechanism.

7. In a parking meter, the combination of a casing provided with a light transmitting portion constituting a beacon, a source of illumination within the beacon, a light screen surrounding the source of illumination and consisting of two portions each adapted to display a different signal, the screen being movable with respect to the source of illumination to effect a shifting of signals, a carriage and a feed screw for moving the carriage through a range occupying a time interval constituting the parking period, means for clutching the carriage to the feed screw to effect elevation thereof, means adapted when actuated to unclutch the carriage at any stage of its elevation to permit restoration of the carriage by gravity to its initial position, and members associated respectively with the carriage and with the light screen for elevating the light screen to effect a shift of signals prior to the expiration of the parking period.

8. In a parking meter, the combination of a casing provided with a light transmitting portion constituting a beacon, a source of illumination within the beacon, a light screen surrounding the source of illumination and consisting of two portions each adapted to display a different signal, the screen being movable with respect to the source of illumination to effect a shifting of signals, a carriage and a feed screw for moving the carriage through a range occupying a time interval constituting the parking period, means for clutching the carriage to the feed screw to effect elevation thereof, means adapted when actuated to unclutch the carriage at any stage of its elevation to permit restoration of the carriage by gravity to its initial position, a latch adapted to hold the light screen in depressed position, a spring backed member carried by the carriage and adapted preliminarily to impose a lifting pressure upon the light screen by the movement of the carriage, and means associated with the carriage for effecting an unlatching of the light screen after the storing up of energy to effect a sudden elevation of the light screen and a change of signals prior to the expiration of the parking period.

9. In a parking meter, the combination of a casing having its upper portion provided with a window and constituting a light transmitting beacon, a light bulb within the beacon having a portion of its surface opaqued to limit the emission of light rays to a limited region, a light screen surrounding and movable with respect to the light emitting region of the bulb, different portions of the light screen being provided with differently colored transparent sections adapted each to be moved into registering position with the light emitting portion of the bulb to display differing signals, and mechanism adapted to toll off an interval of time constituting the parking period and at a predetermined instant prior to the expiration of the parking period to shift the screen to change the signal display.

10. In a parking meter, the combination of a casing having its upper portion provided with a window and constituting a light transmitting beacon, a light bulb within the beacon having a portion of its surface opaqued to limit the emission of light rays to a limited region, a light screen surrounding and movable with respect to the light emitting region of the bulb, different portions of the light screen being provided with differently colored transparent sections adapted each to be moved into registering position with the light emitting portion of the bulb to display differing signals, mechanism adapted to toll off an interval of time constituting the parking period and including a parking period indicating means, said means operating at a predetermined instant prior to the expiration of the parking period to shift the screen to change the signal display, and coin responsive means associated with said indicator means adapted at any instant during the operation of the time tolling mechanism to effect restoration of said indicating means to the initial position to initiate a new full time parking period without interrupting the operation of said mechanism.

11. In a parking meter, the combination of a signal display portion having therein means for varying the signal display at a predetermined instant during the parking interval, a carriage, power operated feeding means therefor, means connecting the carriage to said feeding means to move the carriage throughout its range of movement during a predetermined time interval constituting the parking period, means associated with the carriage for effecting a change of signals at a predetermined instant prior to the expiration of the parking period, and coin actuated means associated with said feeding means and connecting means for effecting restoration of the carriage to its retracted position to initiate a full cycle of operation without interrupting the operation of said feeding means.

12. In a parking meter, the combination of a casing having a light emitting portion constituting a beacon, a window in the casing, a gauge adjacent said window and divided to indicate intervals of time, means also within the casing adapted when actuated to toll off an interval constituting the parking period, coin actuated means for normally connecting said gauge to said tolling mechanism for visibly indicating the passage of time, other signal means within the beacon, and connections between said signal means and the time tolling mechanism for effecting a visible change of signals within the beacon prior to the expiration of the parking period, and thermostatically controlled heating means within the casing and responsive to thermal conditions in said beacon, gauge and signal means for maintaining visible operation thereof in the beacon and window portions of the meter when temperatures fall below a predetermined degree.

13. In a parking meter, the combination of a casing having a light emitting portion constituting a beacon, a window in the casing, a gauge plate adjacent said window divided to indicate intervals of time, coin actuated mechanism within the casing adapted when actuated by a coin to toll off an interval constituting the parking period, separate coin actuated means associated with said mechanism for visibly indicating the passage of said period, signal means within the beacon, and connections between said signal means and the time tolling mechanism and indicator for effecting a visible change of signals within the beacon prior to the expiration of the parking period, said connections including an electrical heating means within the casing, and a thermostatic element adapted when the temperature falls to a predetermined degree within said casing to effect an energizing of the electrical heating means for maintaining desired operating conditions of said mechanism and associated means and visibility through the beacon and window portions of the parking meter.

14. In a parking meter including a source of illumination and a movably mounted light screen coacting therewith, said screen comprising a tubular body adapted to surround said source of illumination and having differently colored sections adapted in different positions of the screen to display different light signals.

15. In a parking meter, the combination of a source of illumination, a movable light screen coacting therewith and having different sections thereof constructed to display differing light signals, energy storing means for moving said screen, coin controlled mechanism having a range of movement commensurate with a predetermined parking period, said mechanism coacting with said energy storing means after the lapse of a portion of the parking period to energize said energy storing means by continued movement of said mechanism, and releasable holding means operable to thereafter release the light screen for effecting a sudden shift in its position by said energy storing means to display a differing light signal.

16. In a parking meter, the combination of a source of illumination, a movable light screen coacting therewith and having different sections thereof constructed to display differing light signals, energy storing means for moving said screen, coin controlled time measuring mechanism having a range of movement commensurate with a predetermined parking period, said mechanism coacting with said energy storing means only after the lapse of a portion of the parking period to energize said energy storing means by continued movement of said mechanism, releasable holding means operable prior to the terminating of a parking period to release the light screen for effecting a sudden shift in its position by said energy storing means to display differing light signals during a portion of the operation of said mechanism, and visible gauge devices associated with the time measuring mechanism and light signal and having the lapse of time during the parking period visibly indicated thereon.

17. In a parking meter, the combination of a source of illumination, a movable light screen coacting therewith and having different sections thereof constructed to display differing light signals, energy storing means for moving said screen, coin controlled time measuring mechanism having a range of movement commensurate with a predetermined parking period, said mechanism coacting with said energy storing means after the lapse of a predetermined portion of the parking period to energize said energy storing means, releasable holding means actuated by said mechanism to thereafter release the light screen for effecting a sudden shift in its position by said energy storing means to display a differing light signal during the remainder of the operating period, visible gauge devices associated with said mechanism and light signal comprising a fixed inscribed gauge plate, and a shield movable thereover with the time measuring mechanism for progressively obscuring the gauge plate to currently reveal on the portion of the gauge plate representing the unexpired part of the parking period.

18. In a parking meter, the combination of a source of illumination, a movable light screen coacting therewith and having different sections thereof constructed to display differing light signals, energy storing means for moving said screen, coin operated time measuring mechanism including a parking period indicator, said indicator being movable relative to said mechanism and having a normal range of movement commensurate with a predetermined parking period, said indicator having means movable therewith after the lapse of a predetermined portion of the parking period to energize said energy storing means by continued movement of said indicator, releasable holding means operable to thereafter release the light screen for effecting a sudden shift in its position by said energy storing means to display a differing light signal, and means for effecting restoration of said indicator and light screen to initial positions at any instant during the operation of said mechanism to permit the initiation of a new cycle of operation without interrupting the operation of said mechanism.

19. In a parking meter, the combination of a casing provided with a light transmitting portion constituting a beacon, a source of illumination within the beacon, a light screen surrounding the source of illumination and having two portions each adapted to display a different light signal, energy storing means for moving said screen with respect to the source of illumination to effect a shifting of signals, a carriage and a feed screw for moving the carriage through a range occupying a time interval constituting the parking period, means for clutching the carriage to the feed screw to effect elevation thereof, means adapted when actuated to unclutch the carriage at any stage of its elevation to permit restoration of the carriage by gravity to its initial position, and releasable holding means associated respectively with the carriage and the light screen for holding the screen during energizing of said energy storing means on elevation of the carriage, said holding means operating at a predetermined elevation of the carriage to release said screen so that the energy storing means will act upon and suddenly elevate the light screen to effect a change of signals prior to the expiration of the parking period.

20. In a parking meter including a time operated mechanism, a source of illumination and a movably mounted light screen having differently colored sections adapted to co-act with said source of illumination, energy storing means for moving said screen relative to said light source, means including a releasable holding means for said screen and operable with said time operated mechanism for first energizing said energy storing means and thereafter releasing said holding means to effect a sudden movement of said screen by said energy storing means, whereby different sections of said screen may be rapidly adjusted to display one light signal after the other during the operation of said time operated mechanism.

PERCY R. FINCH.
JAY MANSFIELD JOHNSON.